(12) United States Patent
Chu

(10) Patent No.: US 6,299,339 B1
(45) Date of Patent: Oct. 9, 2001

(54) LIGHT GENERATING BASE FOR A TREE

(76) Inventor: Chih-Ming Chu, No. 25-4, Chuan-Chou Rd., Hou-Li Hsiang, Taichung Hsien (TW)

(*) Notice: Subject to any disclaimer, the term of this patent is extended or adjusted under 35 U.S.C. 154(b) by 0 days.

(21) Appl. No.: 09/587,780

(22) Filed: Jun. 6, 2000

(51) Int. Cl.$^7$ .............................. F21V 9/08; F21W 121/04
(52) U.S. Cl. .......................... 362/567; 362/123; 362/284; 362/293; 362/324
(58) Field of Search ................................. 362/122, 123, 362/284, 293, 324, 558, 559, 565, 567, 568; 359/889

(56) References Cited

U.S. PATENT DOCUMENTS

| | | | |
|---|---|---|---|
| 3,766,376 | * 10/1973 | Sadacca et al. | 362/567 |
| 4,858,086 | * 8/1989 | Pietrantonio et al. | 362/123 |
| 5,226,709 | * 7/1993 | Labranche | 362/568 |
| 5,442,524 | * 8/1995 | Farmer | 362/284 |
| 5,513,083 | * 4/1996 | Chang | 362/284 |
| 5,702,170 | * 12/1997 | Broderick | 362/568 |
| 5,758,955 | * 6/1998 | Belliveau | 362/293 |

* cited by examiner

Primary Examiner—Alan Cariaso
(74) Attorney, Agent, or Firm—Ladas & Parry

(57) ABSTRACT

A light generating base includes a motor having a motor shaft with upper and lower portions that project upwardly and downwardly from a motor body. The lower portion of the motor shaft is secured to a stand such that the motor body is rotatable relative to the stand about a vertical axis. A lamp unit is mounted on the upper portion of the motor shaft, and is operable so as to radiate light upwardly. An upright filter supporting member has a lower portion that is secured to the motor body, and an upper portion that projects upwardly beyond the lamp unit. A color filter disk is mounted on the upper portion of the filter supporting member so as to be co-rotatable therewith, and is disposed above the lamp unit and transverse to a light radiating direction of the lamp unit. The color filter disk is formed with a plurality of differently colored angularly displaced light filtering regions. An upright fiber supporting member has a lower portion that is secured to the stand, and an upper portion that projects upwardly beyond the color filter disk. An optical fiber bundle includes a plurality of optical fiber strands, and has a lower end secured to the upper portion of the fiber supporting member.

15 Claims, 5 Drawing Sheets

LIGHT GENERATING BASE FOR A TREE

BACKGROUND OF THE INVENTION

1. Field of the Invention

The invention relates to a light generating base, more particularly to one for decorating a tree, such as a Christmas tree.

2. Description of the Related Art

Referring to FIGS. 1 and 2, a conventional Christmas tree 10 has a stand 12 at the bottom of a trunk 11. The trunk 11 is provided with a plurality of branches 13, and a plurality of light diffusing caps 14 disposed on the branches 13. To enable light emission via the light diffusing caps 14, a light generating base 20 is disposed at one side of the stand 12. The light generating base 20 includes a motor 21, a lamp unit 24, a color filter disk 23, and an optical fiber bundle 28. The motor 21 has a motor shaft 211. The color filter disk 23 is connected to the motor shaft 211 to permit rotation thereof about the axis of the motor shaft 211. The lamp unit 24 is disposed on one side of the motor 21, and radiates light upwardly so that different colors of light rays can be generated as the color filter disk 23 rotates. The optical fiber bundle 28 has a lower portion secured above the color filter disk 23, and includes a core 27 and a plurality of optical fiber strands 29. As such, the light rays through the color filter disk 23 can pass along the optical fiber strands 29. The optical fiber strands 29 extend along the branches 13, and are connected to the light diffusing caps 14.

Because the light generating base 20 is disposed at one side of the stand 12, the aesthetic effect of the tree 10 is affected adversely. In addition, a great deal of inconvenience is encountered when moving the tree 10 because the light generating base 20 is formed as a component that is separate from the stand 12.

SUMMARY OF THE INVENTION

Therefore, the object of the present invention is to provide a light generating base for decorating a tree that does not result in inconvenience when transporting the tree and that does not affect adversely the appearance of the tree.

Another object of the present invention is to provide a tree that incorporates a light generating base which is convenient to transport and which has a neat appearance.

According to one aspect of the invention, a light generating base includes a stand, a motor, a lamp unit, an upright filter supporting member, a color filter disk, an upright fiber supporting member and an optical fiber bundle.

The motor includes a motor body and a motor shaft mounted on the motor body. The motor shaft has upper and lower portions that project upwardly and downwardly from the motor body. The lower portion of the motor shaft is secured to the stand such that the motor body is rotatable relative to the stand about a vertical axis. The lamp unit is mounted on the upper portion of the motor shaft, and is operable so as to radiate light upwardly. The upright filter supporting member has a lower portion that is secured to the motor body to permit rotation of the filter supporting member with the motor body relative to the stand, and an upper portion that projects upwardly beyond the lamp unit. The color filter disk is mounted on the upper portion of the filter supporting member so as to be co-rotatable therewith, and is disposed above the lamp unit and transverse to a light radiating direction of the lamp unit. The color filter disk is formed with a plurality of differently colored angularly displaced light filtering regions. The upright fiber supporting member has a lower portion that is secured to the stand, and an upper portion that projects upwardly beyond the color filter disk. The optical fiber bundle includes a plurality of optical fiber strands, and has a lower end secured to the upper portion of the fiber supporting member such that light passing through the color filter disk can be received by the optical fiber strands for transmission therealong.

According to another aspect of the invention, a tree includes a hollow trunk, a plurality of branches mounted on the trunk, and a light generating base. The light generating base includes a stand, a motor, a lamp unit, an upright filter supporting member, a color filter disk, an upright fiber supporting member, and an optical fiber bundle. The motor includes a motor body and a motor shaft mounted on the motor body. The motor shaft has upper and lower portions that project upwardly and downwardly from the motor body. The lower portion of the motor shaft is secured to the stand such that the motor body is rotatable relative to the stand about a vertical axis. The lamp unit is mounted on the upper portion of the motor shaft, and is operable so as to radiate light upwardly. The upright filter supporting member has a lower portion that is secured to the motor body to permit rotation of the filter supporting member with the motor body relative to the stand, and an upper portion that projects upwardly beyond the lamp unit. The color filter disk is mounted on the upper portion of the filter supporting member so as to be co-rotatable therewith, and is disposed above the lamp unit and transverse to a light radiating direction of the lamp unit. The color filter disk is formed with a plurality of differently colored angularly displaced light filtering regions. The upright fiber supporting member has a lower portion that is secured to the stand, and an upper portion that projects upwardly beyond the color filter disk. The optical fiber bundle includes a plurality of optical fiber strands, and has a lower end secured to the upper portion of the fiber supporting member such that light passing through the color filter disk can be received by the optical fiber strands for transmission therealong. The optical fiber bundle extends into the hollow trunk. The optical fiber strands extend outwardly of the hollow trunk and along the branches.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
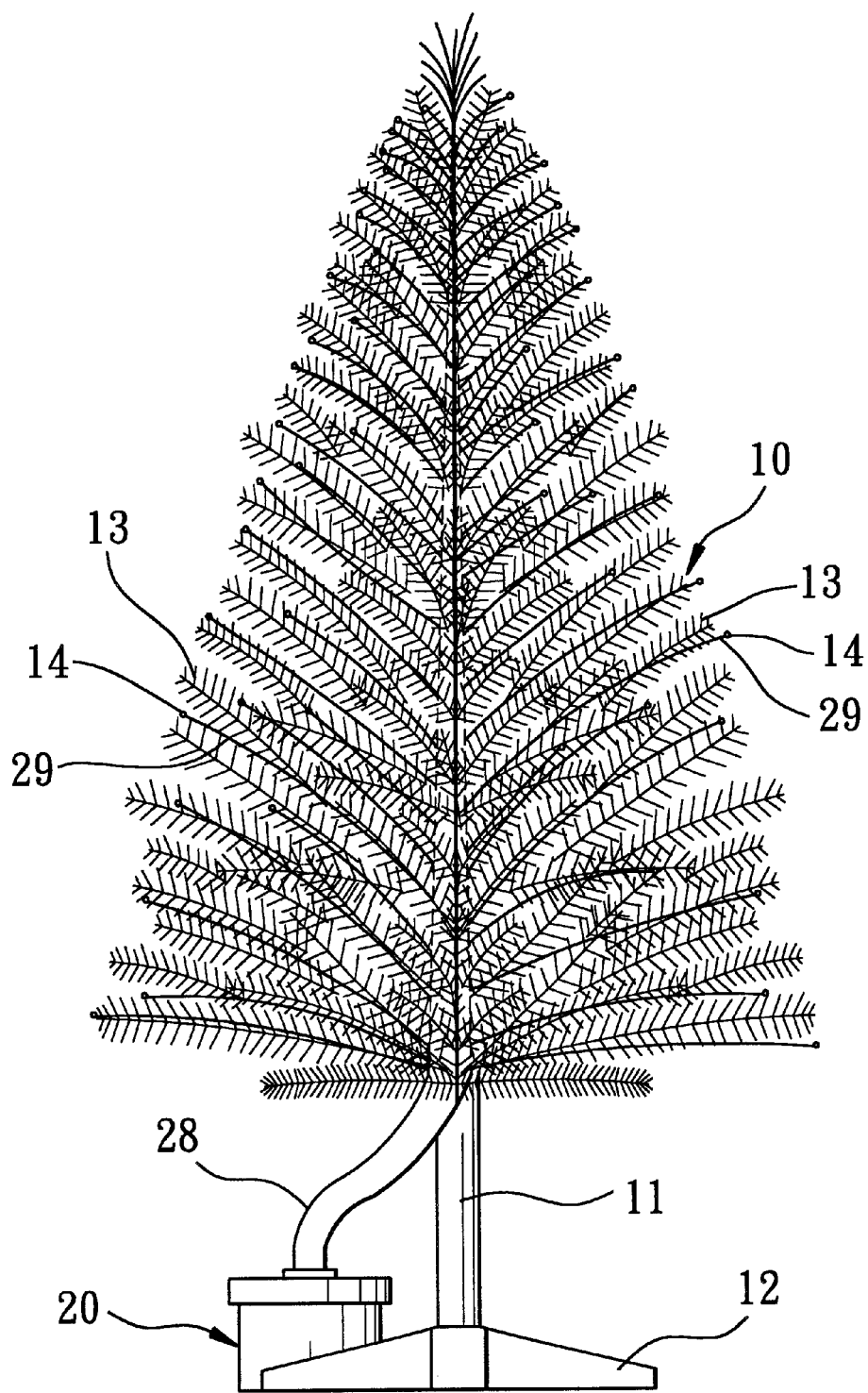
FIG. 1 is a schematic view of a Christmas tree with a conventional light generating base.
Figure 2:
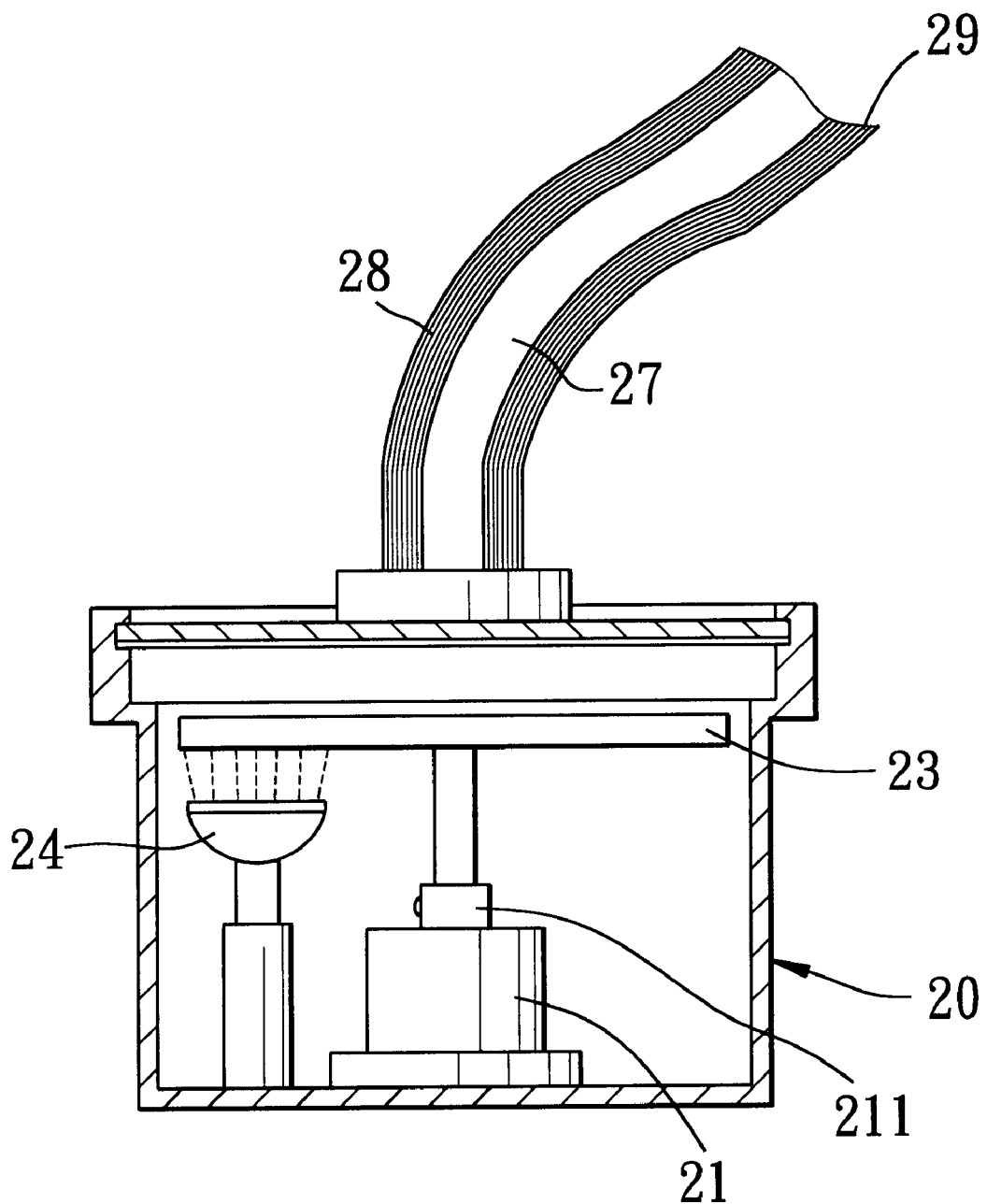
FIG. 2 is a fragmentary partly cross-sectional view of the conventional light generating base.
Figure 3:
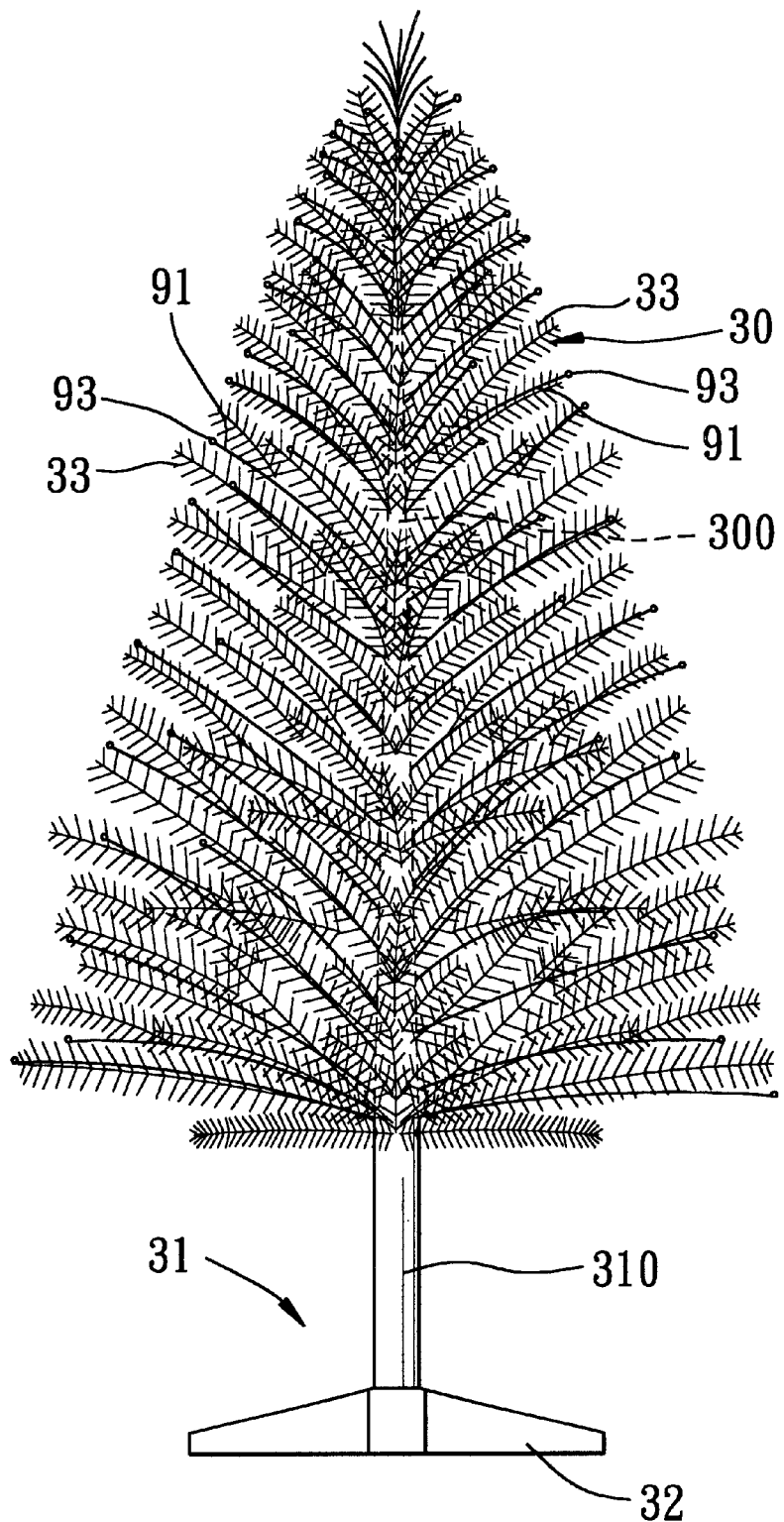
FIG. 3 is a schematic view of the preferred embodiment of a Christmas tree with a light generating base according to the present invention.
Figure 4:
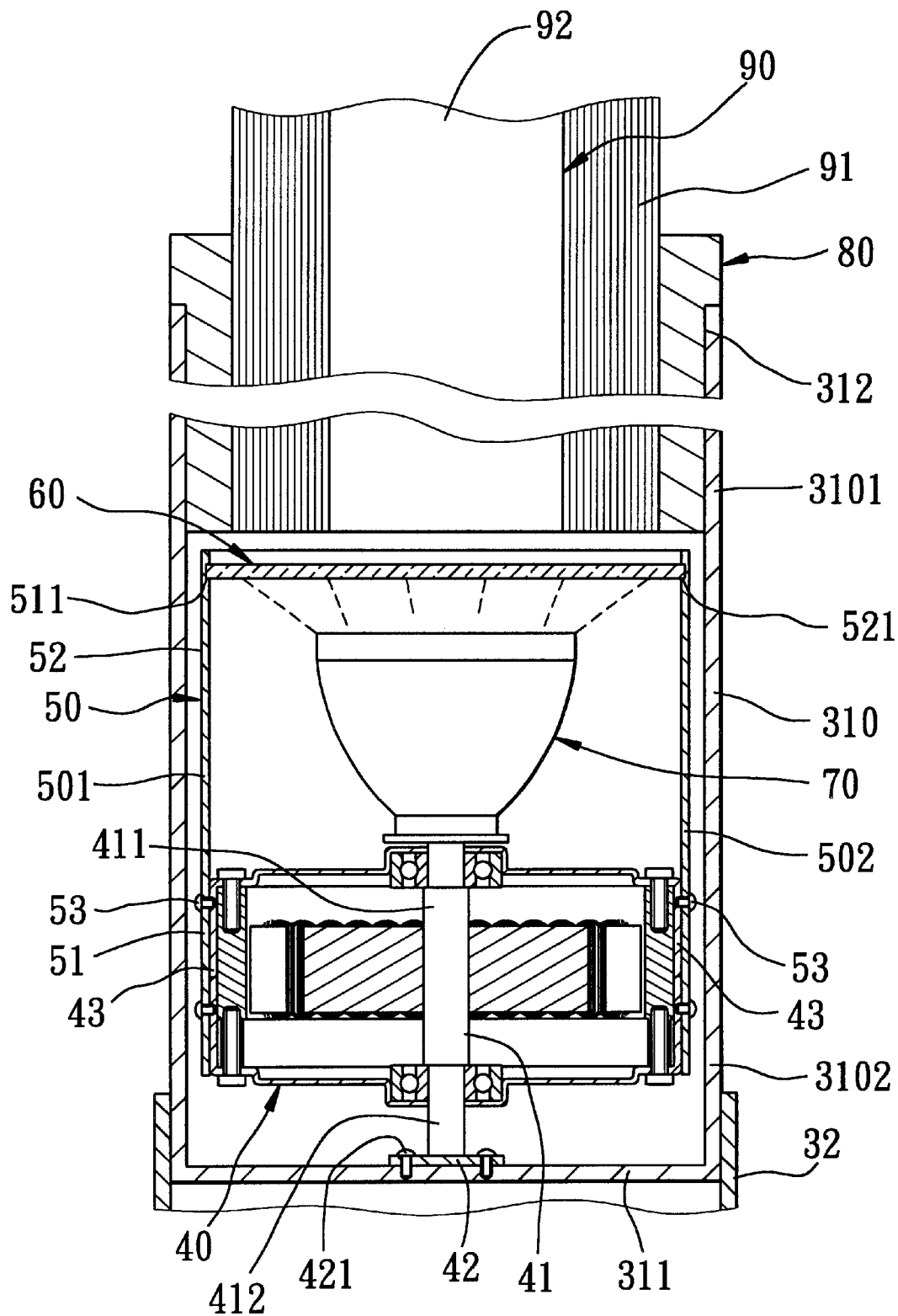
FIG. 4 is a fragmentary partly cross-sectional view of the preferred embodiment.

Referring to FIGS. 3 and 4, the preferred embodiment of a light generating base 31 according to the present invention is shown to be incorporated in a tree 30, such as a Christmas tree, so as to decorate the same.

The light generating base 31 includes a stand 32, a motor 40, a lamp unit 70, an upright filter supporting member 50, a color filter disk 60, an upright fiber supporting member 310 and an optical fiber bundle 90.

Figure 5:
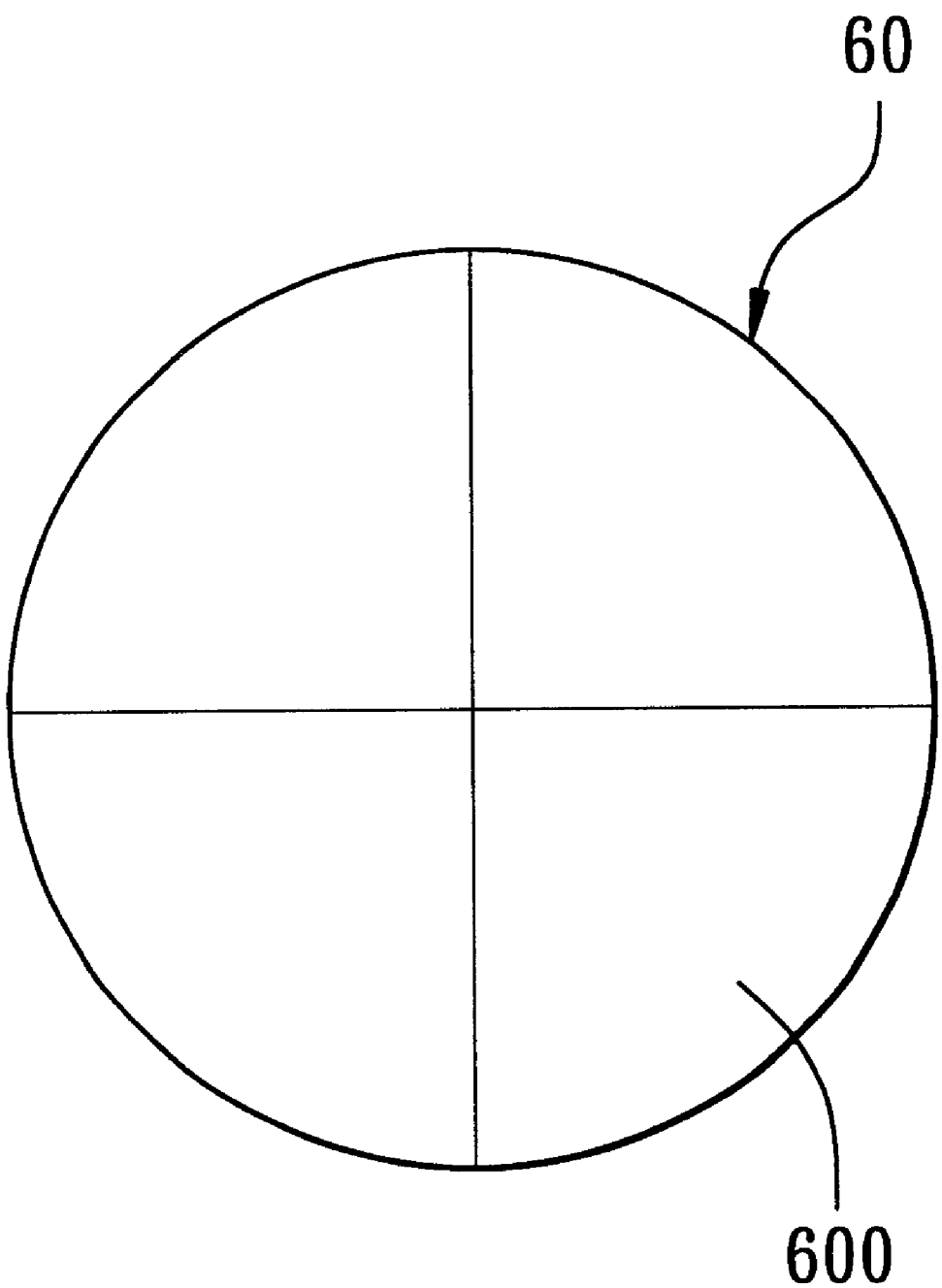
FIG. 5 is a schematic top view of a color filter disk of the preferred embodiment.

The fiber supporting member 310 is tubular in shape, and has the motor 40, the lamp unit 70, the filter supporting member 50, and the color filter disk 60 disposed therein. The fiber supporting member 310 has upper and lower portions 3101, 3102. The lower portion 3102 of the fiber supporting member 310 is mounted securely on the stand 32, and is provided with a bottom wall 311. The motor 40 includes a motor body 43 and a motor shaft 41 mounted on the motor body 43. The motor shaft 41 has upper and lower portions 411, 412 that project upwardly and downwardly from the motor body 43. The lower portion 412 of the motor shaft 41 is provided with an anchoring plate 42 that is secured to the bottom wall 311 via fastening members 421 such that the motor body 43 is rotatable relative to the stand 32 about a vertical axis. The lamp unit 70 is mounted on the upper portion 411 of the motor shaft 41, and is operable so as to radiate light upwardly. The filter supporting member 50 has a lower portion 51 that is secured to the motor body 43 via fastening members 53 to permit rotation of the filter supporting member 50 with the motor body 43 relative to the stand 32, and an upper portion 52 that projects upwardly beyond the lamp unit 70. In the preferred embodiment, the filter supporting member 50 includes a pair of upright supporting boards 501, 502 mounted on opposite sides of the motor body 43. The color filter disk 60 is mounted on the upper portion 52 of the filter supporting member 50 by virtue of its engagement with confronting grooves 511, 521 in the supporting boards 501, 502. The color filter disk 60 is rotatable with the filter supporting member 50, and is disposed above the lamp unit 70 and transverse to a light radiating direction of the lamp unit 70. As shown in FIG. 5, the color filter disk 60 is formed with a plurality of differently colored angularly displaced light filtering regions 600.

The upper portion 3101 of the fiber supporting member 310 projects upwardly beyond the color filter disk 60. The optical fiber bundle 90 includes a plurality of optical fiber strands 91 and a core 92 surrounded by the optical fiber strands 91. The lower end of the optical fiber bundle 90 is secured to the upper portion 3101 of the fiber supporting member 310 by means of a retaining ring 80. Thus, light passing through the color filter disk 60 can be received by the optical fiber strands 91 for transmission therealong.

In use, the optical fiber bundle 90 extends into a hollow trunk 300 of the tree 30. The hollow trunk 300 is preferably formed from a plurality of concentric trunk sections (not visible) to permit the optical fiber strands 91 to extend outwardly of the hollow trunk 300 at different heights. A plurality of branches 33 are mounted on the trunk 300, and are provided with a plurality of light diffusing caps 93. The optical fiber strands 91 extend along the branches 33, and are connected to the light diffusing caps 93. As such, the light transmitted by the optical fiber strands 91 is thus emitted via the light diffusing caps 93.

Since the light generating base 31 is incorporated into the tree 30, transporting of the tree 30 can be facilitated, and the neat appearance of the tree 30 can be maintained.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:
1. A light generating base, comprising:
a stand;
a motor including a motor body and a motor shaft mounted on said motor body, said motor shaft having upper and lower portions that project upwardly and downwardly from said motor body, said lower portion of said motor shaft being secured to said stand such that said motor body is rotatable relative to said stand about a vertical axis;
a lamp unit mounted on said upper portion of said motor shaft and operable so as to radiate light upwardly;
an upright filter supporting member having a lower portion that is secured to said motor body to permit rotation of said filter supporting member with said motor body relative to said stand, and an upper portion that projects upwardly beyond said lamp unit;
a color filter disk mounted on said upper portion of said filter supporting member so as to be co-rotatable therewith and disposed above said lamp unit and transverse to a light radiating direction of said lamp unit, said color filter disk being formed with a plurality of differently colored angularly displaced light filtering regions;
an upright fiber supporting member having a lower portion that is secured to said stand, and an upper portion that projects upwardly beyond said color filter disk; and
an optical fiber bundle including a plurality of optical fiber strands, and having a lower end secured to said upper portion of said fiber supporting member such that light passing through said color filter disk can be received by said optical fiber strands for transmission therealong.

2. The light generating base of claim 1, wherein said filter supporting member includes a pair of upright supporting boards mounted on opposite sides of said motor body.

3. The light generating base of claim 2, wherein said supporting boards are formed with confronting grooves for engaging said color filter disk.

4. The light generating base of claim 1, wherein said fiber supporting member is tubular in shape, and has said motor, said lamp unit, said filter supporting member and said color filter disk disposed therein.

5. The light generating base of claim 4, wherein said upper portion of said fiber supporting member is provided with a retaining ring for retaining said lower end of said optical fiber bundle thereon.

6. The light generating base of claim 4, wherein said lower portion of said fiber supporting member is provided with a bottom wall having said lower portion of said motor shaft secured thereto.

7. The light generating base of claim 1, wherein said optical fiber bundle further includes a core surrounded by said optical fiber strands.

8. A tree comprising:
a hollow trunk;
a plurality of branches mounted on said trunk; and
a light generating base including
a stand,
a motor including a motor body and a motor shaft mounted on said motor body, said motor shaft having upper and lower portions that project upwardly and downwardly from said motor body, said lower portion of said motor shaft being secured to said stand such that said motor body is rotatable relative to said stand about a vertical axis, a lamp unit mounted on said upper portion of said motor shaft and operable so as to radiate light upwardly, an upright filter supporting member having a lower portion that is secured to said motor body to permit rotation of said filter supporting member with said motor body relative to said stand, and an upper portion that projects upwardly beyond said lamp unit, a color filter disk mounted on said upper portion of said filter supporting member so as to be co-rotatable therewith and disposed above said lamp unit and transverse to a light radiating direction of said lamp unit, said color filter disk being formed with a plurality of differently colored angularly displaced light filtering regions, an upright fiber supporting member having a lower portion that is secured to said stand, and an upper portion that projects upwardly beyond said color filter disk, and an optical fiber bundle including a plurality of optical fiber strands, and having a lower end secured to said upper portion of said fiber supporting member such that light passing through said color filter disk can be received by said optical fiber strands for transmission therealong, said optical fiber bundle extending into said hollow trunk, said optical fiber strands extending outwardly of said hollow trunk and along said branches.

9. The tree of claim 8, wherein said branches are provided with a plurality of light diffusing caps that are connected to said optical fiber strands.

10. The tree of claim 8, wherein said filter supporting member includes a pair of upright supporting boards mounted on opposite sides of said motor body.

11. The tree of claim 10, wherein said supporting boards are formed with confronting grooves for engaging said color filter disk.

12. The tree of claim 8, wherein said fiber supporting member is tubular in shape, and has said motor, said lamp unit, said filter supporting member and said color filter disk disposed therein.

13. The tree of claim 12, wherein said upper portion of said fiber supporting member is provided with a retaining ring for retaining said lower end of said optical fiber bundle thereon.

14. The tree of claim 12, wherein said lower portion of said fiber supporting member is provided with a bottom wall having said lower portion of said motor shaft secured thereto.

15. The tree of claim 8, wherein said optical fiber bundle further includes a core surrounded by said optical fiber strands.

* * * * *